(12) United States Patent
Tan et al.

(10) Patent No.: US 8,207,813 B2
(45) Date of Patent: Jun. 26, 2012

(54) ELECTRONIC DEVICE AND METHOD

(75) Inventors: Daniel Qi Tan, Rexford, NY (US); Patricia Chapman Irwin, Altamont, NY (US); Abdelkrim Younsi, Ballston Lake, NY (US); Yingneng Zhou, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 933 days.

(21) Appl. No.: 12/204,013

(22) Filed: Sep. 4, 2008

(65) Prior Publication Data

US 2009/0142580 A1   Jun. 4, 2009

Related U.S. Application Data

(60) Provisional application No. 60/991,871, filed on Dec. 3, 2007.

(51) Int. Cl.
*H01C 7/10* (2006.01)

(52) U.S. Cl. .......... 338/20; 338/21; 252/519.51; 501/94

(58) Field of Classification Search .............. 338/20–21; 252/519.51; 501/1, 94, 134
See application file for complete search history.

(56) References Cited

U.S. PATENT DOCUMENTS

| | | | |
|---|---|---|---|
| 4,681,717 A | 7/1987 | Brooks et al. | |
| 4,992,333 A | 2/1991 | Hyatt | |
| 4,996,510 A | 2/1991 | Becker et al. | |
| 5,039,452 A | 8/1991 | Thompson et al. | |
| 5,153,554 A | 10/1992 | Becker et al. | |
| 5,235,310 A | 8/1993 | Cowman et al. | |
| 5,271,969 A | 12/1993 | Ogura | |
| 5,369,390 A | 11/1994 | Lin et al. | |
| 5,484,766 A | 1/1996 | Shah et al. | |
| 5,594,406 A | 1/1997 | Koyama et al. | |
| 5,811,033 A | 9/1998 | Itoh et al. | |
| 5,952,040 A * | 9/1999 | Yadav et al. | 427/126.3 |
| 5,973,589 A * | 10/1999 | Wu et al. | 338/21 |
| 6,351,011 B1 | 2/2002 | Whitney et al. | |
| 6,366,193 B2 | 4/2002 | Duggal et al. | |
| 6,373,372 B1 | 4/2002 | Duggal et al. | |
| 6,444,504 B1 | 9/2002 | Zivic | |
| 6,542,065 B2 | 4/2003 | Shrier et al. | |
| 6,620,346 B1 * | 9/2003 | Schulz et al. | 252/519.51 |
| 6,627,100 B2 | 9/2003 | Ando et al. | |
| 6,913,827 B2 | 7/2005 | George et al. | |
| 7,075,404 B2 * | 7/2006 | Hirose et al. | 338/21 |
| 7,085,118 B2 | 8/2006 | Inoue et al. | |
| 7,132,922 B2 | 11/2006 | Harris | |
| 7,258,819 B2 | 8/2007 | Harris | |
| 7,372,357 B2 * | 5/2008 | Nakano | 338/21 |

(Continued)

OTHER PUBLICATIONS

Levinson, The Physics of metal oxide varistors, Mar. 1975, Journal of APllied Science, vol. 46, No. 3, pp. 1332 to 1341.*

(Continued)

*Primary Examiner* — Kyung Lee
(74) *Attorney, Agent, or Firm* — Joseph J. Christian

(57) ABSTRACT

A varistor pre-assembly includes an electrode formable structure and a sinterable mass proximate to electrode formable structure. The electrode formable structure includes a material having a melting point that may be within a determined temperature relative to a sintering temperature of the sinterable mass. The electrode formable structure and sinterable mass may form a varistor when simultaneously subjected to the sintering temperature, which may be less than about 1000 degrees Celsius. A method to make the article is also provided.

22 Claims, 5 Drawing Sheets

U.S. PATENT DOCUMENTS

2004/0015983 A1    1/2004    Lemmons

OTHER PUBLICATIONS

R.G Dosch et al; "Chemical preparation and properties of high-field zinc oxide varistors"; J. Mater. Res. vol. 1(1), pp. 90-99, Jan./Feb. 1986.

Yuanhua Lin et al.; "Characterisation of ZnO-based Varistors Prepared from Nanometre Precursor Powders"; Advanced Materials for Optics and Electronics, Advanced Materials.Opt.Electron, vol. 9, pp. 205-209, 1999.

Tohver et al.; "Direct-Write Fabrication of Zinc Oxide Varistors"; J. Am. Ceram. Soc., 85 [1],123-28 (2002).

Pedro Duran et al.; "A Strategic Two-Stage Low-Temperature Thermal Processing Leading to Fully Dense and Fine-Grained Doped-ZnO Varistors"; Advanced Materials, vol. 14(2), pp. 137-141, 2002.

Suresh C. Pillai et al.; "The effect of processing conditions on varistors prepared from nanocrystalline ZnO"; J. Mater.Chem. vol. 13, pp. 2586-2590, 2003.

Nelson S. Bell et al.; "Colloidal processing of chemically prepared zinc oxide varistors. Part II: Near-net-shape forming and fired electrical properties"; J. Mater. Res. vol. 19(5), pp. 1341-1347, 2004.

Suresh C. Pillai et al.; "Self-assembled arrays of ZnO nanoparticles and their application as varistor materials"; J.Mater.Chem. vol. 14, pp. 1572-1578, 2004.

Fangli Yuan et al.; "Microstructure of Varistors Prepared with Zinc Oxide Nanoparticles Coated with Bi2O3"; J. Am. Ceram. Soc., 87 [4] 736-38 (2004).

* cited by examiner

ELECTRONIC DEVICE AND METHOD

RELATED APPLICATIONS

This application is a non-provisional application that claims priority to provisional U.S. Pat. application Ser. No. 60/991,871, filed Dec. 3, 2007; the disclosure of which is hereby incorporated by reference.

BACKGROUND

1. Technical Field

The invention includes embodiments that relate to a surge protector and/or a varistor. The invention includes embodiments that relate to a method of making and/or using the derived device.

2. Discussion of Art

A varistor is an electronic component with a non-ohmic current-voltage characteristic. Varistors may protect circuits against excessive transient voltages by incorporating them into the circuit in such a way that, when triggered, they will shunt the current created by the high voltage away from the sensitive components. A varistor may be known as Voltage Dependent Resistor or VDR.

A type of varistor is the Metal Oxide Varistor (MOV). This contains a ceramic mass of zinc oxide grains, in a matrix of other metal oxides (such as small amounts of bismuth, cobalt, manganese) sandwiched between two metal plates (the electrodes). The boundary between each grain and its neighbour forms a diode junction, which allows current to flow in only one direction. The mass of randomly oriented grains is electrically equivalent to a network of back-to-back diode pairs, each pair in parallel with many other pairs. When a small or moderate voltage is applied across the electrodes, only a tiny current flows, caused by reverse leakage through the diode junctions. When a large voltage is applied, the diode junctions break down because of the avalanche effect, and a large current flows. The result of this behaviour is a highly nonlinear current-voltage characteristic, in which the MOV has a high resistance at low voltages and a low resistance at high voltages.

A varistor remains non-conductive as a shunt mode device during normal operation when voltage remains well below its "clamping voltage". If a transient pulse (often measured in joules) is too high, the device may melt, burn, vaporize, or otherwise be damaged or destroyed. This unacceptable (catastrophic) failure occurs when "Absolute Maximum Ratings" are exceeded. Varistor degradation is defined using curves that relate current, time, and number of transient pulses. A varistor fully degrades when its "clamping voltage" has changed by 10 percent. A fully degraded varistor may remain functional, having no catastrophic failure, and may not be visually damaged.

It may be desirable to have a method that differs from those methods currently available to provide an article or a composition with properties and characteristics that differ from those properties of currently available articles and compositions.

BRIEF DESCRIPTION

In one embodiment, a varistor pre-assembly is provided that includes an electrode formable structure and a sinterable mass proximate to electrode formable structure. The electrode formable structure includes a material having a melting point that may be within a determined temperature relative to a sintering temperature of the sinterable mass. The electrode formable structure and sinterable mass may form a varistor when simultaneously subjected to the sintering temperature, which may be less than about 1000 degrees Celsius.

In one embodiment, a method is provided that includes sintering a sinterable mass at a temperature profile that may be sufficiently high such that a sintered mass may be formed from the sinterable mass. The temperature profile may be less than about 1050 degrees Celsius. The method may include forming one or more electrodes coupled to the sintered mass simultaneously with the sintering, and thereby to form a varistor having one or more electrodes coupled to, and in electrical communication through, the sintered mass.

DETAILED DESCRIPTION

Figure 1:
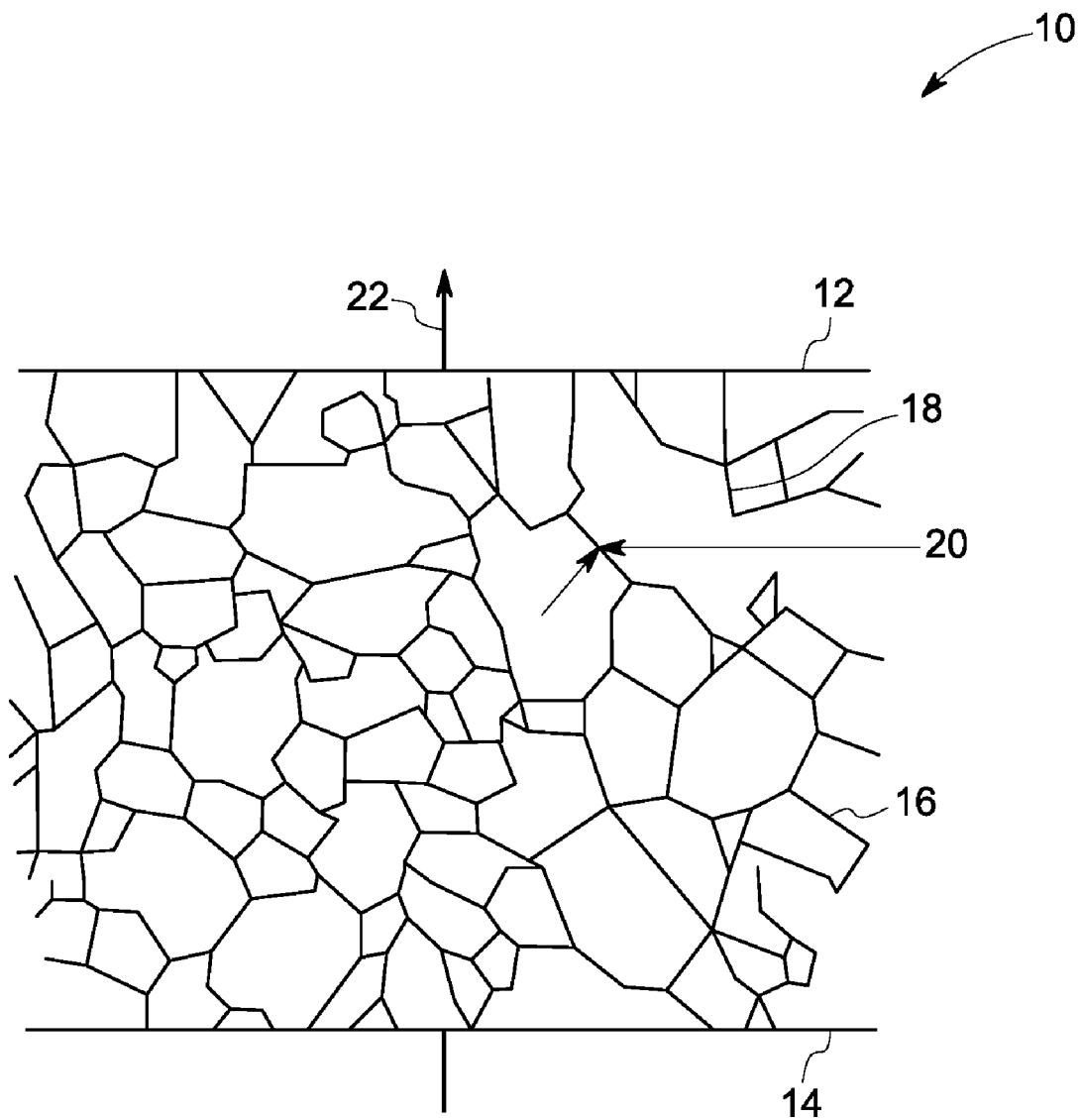
FIG. 1 shows a schematic drawing of an article in accordance with one embodiment of the invention.

The invention includes embodiments that relate to a device for use as a surge protector and/or varistor. The invention includes embodiments that relate to a method of making and/or using the derived device.

As used herein, the term sintering is a method for making objects from particles or powder by heating the material (below its melting point) until its particles adhere to each other. Sintered refers to particles or powder that has undergone a sintering process. A sintered mass refers to the formed shape that is the result of the sintering of powders or particulate. In the sintered mass, formerly discrete particles or powder grains retain a core, and the interstitial area from one core to another core is at least partially filled with a grain boundary layer that separates the cores.

In one embodiment, an article includes a varistor pre-assembly. In one embodiment, the varistor preassembly includes an electrode formable structure and a sinterable mass.

In one embodiment, the electrode formable structure may include silver. In one embodiment, the electrode formable structure may include one or more of platinum, palladium, copper, silver, tin, aluminum, iron, carbon, nickel, antimony, chromium, or gold. Alloys of the foregoing are also suitable based on application specific parameters (such as brass or Ni—Sn). In one embodiment, the electrode formable structure includes carbon, and the carbon may be amorphous or structured (such as in a nanotube or nanowire). In another embodiment, the electrode formable structure may include one or more of palladium, platinum, or gold that may be present in an amount or a ratio such that the melting temperature of the electrode formable structure may be controlled relative to the sintering temperature of the sinterable mass such that co-firing of the electrode formable structure and the sinterable mass at about the sintering temperature produces a varistor. In yet another embodiment, the electrode formable structure may be free of platinum, palladium, or both platinum and palladium. In another embodiment, the amount of platinum, palladium, or both platinum and palladium may be less than about 0.05 weight percent. In one embodiment, the electrode formable structure includes a material that has a melting point that may be within a determined temperature relative to a sintering temperature of the sinterable mass. In another embodiment, the electrode formable structure may include a metal having a melting point of less than about 1000 degrees Celsius. In another embodiment, the electrode formable structure may include a metal having a melting point in a range from about 1000 degrees Celsius to about 950 degrees Celsius, from about 950 degrees Celsius to about 900 degrees Celsius, from about 900 degrees Celsius to about 875 degrees Celsius, or from about 875 degrees Celsius to about 850 degrees Celsius, or from about 850 degrees Celsius to about 750 degrees Celsius.

In one embodiment, the sinterable mass includes a transition metal. In one embodiment, the transition metal may be a transition metal oxide. Examples of transition metal oxides include but are not limited to zinc oxide, tin oxide, and titanium oxide. In one embodiment, the transition metal oxide includes a zinc oxide. The amount of the transition metal oxide, by weight, may be greater than about 80 percent based on the total weight of the sinterable mass. In one embodiment, the amount may be in a range of from about 80 weight percent to about 85 weight percent, from about 85 weight percent to about 90 weight percent, or from about 90 weight percent to about 95 weight percent, or from about 95 weight percent to about 98 weight percent based on the total weight of the sinterable mass.

In one embodiment, the sinterable mass may include a sintering additive and a grain growth inhibitor additive. In one embodiment, the sintering additive may include one or more of aluminum, lithium, antimony, bismuth, cobalt, chromium, manganese, nickel, magnesium, or silicon. The sintering additive may include a combination of two or more of the foregoing. In one embodiment, the sintering additive includes one or more of $SiO_2$, $Mn_2O_3$, NiO, $MnO_2$, or $MnCO_3$. In one embodiment, the sintering additive may include one or more of $Li_2CO_3$, and $LiBiO_3$. In one embodiment, the sintering additive may include only one of the foregoing. The selection of the sintering additive may be based on one or more factors as the sintering additives differ in efficacy and effect. Such factors may include the desired sintering temperature, the sintering pressure, the material performance, and the desired grain characteristics.

In one embodiment, the sinterable mass includes a grain growth inhibitor additive. In one embodiment, the grain growth inhibitor additive may include one or more of $Sb_2O_3$, CaO, $Al_2O_3$, MgO, or $Fe_2O_3$. In one embodiment, the grain growth inhibitor may consist essentially of only one of the foregoing. The selection of the grain growth inhibitor additive may be based on one or more factors as the grain growth inhibitor additive differ in efficacy and effect. Such factors may include the desired sintering temperature, the sintering pressure, the material performance, and the desired grain characteristics. In one embodiment, the grain growth inhibitor additive may inhibit grain growth to maintain relatively smaller grains. In one embodiment, the grain growth inhibitor additive may include a combination of two or more of the foregoing. In another embodiment, the grain growth inhibitor additive may control the grain size distribution, as well.

In one embodiment, the sinterable mass may further include a grain boundary additive. In one embodiment, the grain boundary additive includes a breakdown voltage additive. In one embodiment, the grain boundary additive may enhance the grain boundary barrier. In one embodiment, the grain boundary additive may include one or more of $Co_3O_4$, $Co_2O_3$, $Cr_2O_3$, $Bi_2O_3$, $Pr_2O_3$, NiO, or $SnO_2$. In one embodiment, the grain boundary additive consists essentially of only one of the foregoing. The selection of the grain boundary additive may be based on one or more factors as the grain boundary additive differ in efficacy and effect. Such factors may include the desired sintering temperature, the sintering pressure, the material performance, and the desired grain characteristics. The grain boundary additive may be present in an amount less than about 1 weight percent. In one embodiment, the grain boundary additive may be present in an amount in a range of from about 0.01 weight percent to about 0.5 weight percent, from about 0.5 weight percent to about 0.75 weight percent, or from about 0.75 weight percent to about 1 weight percent. In one embodiment, the composition may be free of $Co_2O_3$. In another embodiment, the amount of $Co_2O_3$ may be less than about 0.05 weight percent. In one embodiment, the additive may include a combination of two or more of the foregoing.

In one embodiment the varistor pre-assembly may be sintered to form a nano-structured varistor. The nano-structured varistor may include a sintered mass and an electrode. The sintered mass includes a plurality of nano-sized cores and a grain boundary layer disposed between each of the plurality of cores. Each of the cores may include the transition metal oxide. The grain boundary layer may include the sintering additive, the grain boundary additive, and/or a breakdown voltage additive. In one embodiment, the grain boundary layer may be disposed between each of the plurality of the cores.

In one embodiment, the varistor includes a structure as shown in FIG. 1. A varistor 10 is provided which includes electrodes 12 and 14 consisting of silver and a sintered mass 16. The sintered mass includes a plurality of nano-sized cores 18 and a grain boundary layer 20 disposed between each of the plurality of cores. A current 22 is applied to the varistor.

In one embodiment, the sintering additive may be present in an amount that may be less than about 20 percent by weight, based on the total weight of the sintered mass. In one embodiment, the sintering additive amount may be in a range of from about 20 percent to about 15 percent, from about 15 percent to about 10 percent, from about 10 percent to about 8 percent, from about 8 percent to about 4 percent, from about 4 percent to about 2 percent, from about 2 percent to about 0.5 percent, from about 0.5 percent to about 0.3 percent, or from about 0.3 percent to about 0.1 percent, or from about 0.1 percent to about 0.03 percent.

In one embodiment, the grain growth inhibitor additive may be present in the sintered mass in an amount, by weight, that is less than about 10 percent based on the total weight of the sintered mass. In one embodiment, the grain growth inhibitor additive amount may be in a range of from about 10 weight percent to about 8 weight percent, from about 8 weight percent to about 6 weight percent, 6 weight percent to about 4 weight percent, from about 4 weight percent to about 2 weight percent, from about 2 weight percent to about 1 weight percent, from about 1 weight percent to about 0.5 weight percent, from about 0.5 weight percent to about 0.1 weight percent, or less than about 0.1 weight percent.

In one embodiment, the grain boundary additive may be present in the sintered mass in an amount, by weight, that may be less than about 10 percent based on the total weight of the sinterable mass. In one embodiment, the grain boundary additive may be present in an amount in a range of from about 10 weight percent to about 8 weight percent, from about 8 weight percent to about 6 weight percent, from about 6 weight percent to about 4 weight percent, from about 4 weight percent to about 2 weight percent, from about 2 weight percent to about 1 weight percent, from about 1 weight percent to about 0.5 weight percent, from about 0.5 weight percent to about 0.1 weight percent, or less than about 0.1 weight percent.

The nano-structured varistor may include a sintered mass having a plurality of nano-sized cores. In one embodiment, the average distance from one core to an adjacent core in the plurality of cores may be less than about 1 micrometer. In one embodiment, the average distance may be in a range of from about 1 micrometer to about 0.8 micrometers, or from about 0.8 micrometers to about 0.5 micrometers. In another embodiment, the average distance may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers.

In one embodiment, the average diameter of the core in the plurality of cores may be less than about 1 micrometer. In one embodiment, the average diameter may be in a range of from about 1 micrometer to about 0.8 micrometers, or from about 0.8 micrometers to about 0.5 micrometers. In another embodiment, the average diameter may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers.

The micro-structure or nano-structure of the sintered mass may be expressed in terms of an average distance from one core to an adjacent core in the sintered mass. The average distance from one core to an adjacent core in the sintered mass may be less than 5 micrometers. In one embodiment, the average distance may be in a range of from about 1 micrometer to about 0.8 micrometers, or from about 0.8 micrometers to about 0.5 micrometers. In another embodiment, the average distance may be in a range of from about 500 nanometers to about 400 nanometers, from about 400 nanometers to about 300 nanometers, from about 300 nanometers to about 250 nanometers, from about 250 nanometers to about 200 nanometers, from about 200 nanometers to about 150 nanometers, from about 150 nanometers to about 100 nanometers, from about 100 nanometers to about 50 nanometers, or less than about 50 nanometers. An exemplary core-to-core average distance may be in a range of from about 35 nanometers to about 75 nanometers.

The distance of one core to another core, coupled with the core size, may affect the average thickness of the grain boundary layer. In one embodiment, the average thickness of the grain boundary layer may be less than about 1 micrometer. In another embodiment, the average thickness may be in a range of from about 1 micrometer to about 0.8 micrometers, or from about 0.8 micrometers to about 0.5 micrometers. In yet another embodiment, the average thickness may be in a range of from about 500 nanometers to about 400 nanometers, from about 400 nanometers to about 300 nanometers, from about 300 nanometers to about 250 nanometers, from about 250 nanometers to about 100 nanometers, from about 100 nanometers to about 50 nanometers, from about 50 nanometers to about 35 nanometers, from about 35 nanometers to about 20 nanometers, or less than about 20 nanometers.

The grain boundary layer thickness, may be expressed as a mean value in nanometers. The mean value for the grain boundary layer may be less than about 50 nanometers. In one embodiment, the mean value may be in a range of from about 50 nanometers to about 10 nanometers, from about 10 nanometers to about 1 nanometer, or from about 1 nanometer to about 0.1 nanometers.

In one embodiment, the average thickness of the nano-structured sintered mass may be less than 3000 micrometers. In another embodiment, the average thickness of the nano-structured sintered mass may be in a range of from about 3000 micrometer to about 2500 micrometers, or from about 2500 micrometer to about 2000 micrometers, or from about 2000 micrometer to about 1550 micrometers, or from about 1550 micrometer to about 1000 micrometers, or from about 1000 micrometer to about 700 micrometers, or from about 700 micrometers to about 500 micrometers. In yet another embodiment, the average thickness of the nano-structured sintered mass may be in a range of from about 500 micrometers to about 100 micrometers, from about 100 micrometers to about 50 micrometers. In another embodiment, average thickness of the nano-structured sintered mass may be less than 50 micrometers.

In addition to such factors as the uniformity of core diameters, the uniformity of distribution of materials, and the uniformity of the grain boundary layer, the average distance of the cores from one to another may affect the performance, properties and characteristics of the varistor device made therefrom. Particularly, the diode junction performance, and the number of diode junctions per unit volume, may flow directly from the core spacing parameter.

The thermal profile may play a role in the melt temperature of the electrode of the MOV device. If the thermal profile is higher than the electrode melt temperature, then the electrode may be melted, damaged or destroyed. A higher thermal excursion during manufacture or sinter may then require an electrode with a corresponding melt temperature suitable for use after exposure to that temperature. In addition, if the thermal profile shows a temperature excursion too high, the micro-structure or nano-structure may change and the sintered particles may melt and flow together rather than remain as a sintered mass. This may need to be balanced, as at least some heat is needed to get the particles to sinter in the first instance. Lower temperature capable electrode materials may be employed to avoid a high thermal profile in addition to being economically desirable. In one embodiment, the at least one electrode formable structure may include a metal having a melting point of less than the temperature profile.

In one embodiment, the article may be produced by sintering a sinterable mass at a temperature profile that may be sufficiently high such that a sintered mass may be formed from the sinterable mass. In one embodiment, the temperature profile includes exposure to a sinter temperature of less than about 1050 degrees Celsius. The sintered may have a thermal profile also known as thermal history that may include exposure to a sintering temperature of not greater than about 1050 degrees Celsius. In one embodiment, the thermal profile includes exposure to a sinter temperature in a range of from about 1050 degrees Celsius to about 1000 degrees Celsius, from about 1000 degrees Celsius to about 950 degrees Celsius, from about 950 degrees Celsius to about 900 degrees Celsius, from about 900 degrees Celsius to about 875 degrees Celsius, or from about 875 degrees Celsius to about 850 degrees Celsius or from about 850 degrees Celsius to about 800 degrees Celsius.

In one embodiment, the method may include calcining the transition metal oxide and the sintering additive together before forming the mixture. Calcining of the transition metal oxide and the sintering additive may include heating to a temperature that may be greater than about 400 degrees Celsius. In one embodiment, calcining may include exposure of the mixture to a temperature in a range of from about room temperature to about 400 degrees, from about 400 degrees Celsius to about 450 degrees Celsius, from about 450 degrees Celsius to about 550 degrees Celsius, from about 550 degrees Celsius to about 600 degrees Celsius, from about 600 degrees Celsius to about 650 degrees Celsius, or from about 650 degrees Celsius to about 800 degrees Celsius.

In one embodiment, a method may include contacting a transition metal oxide with a sintering additive to form a premix, wherein the transition metal oxide comprises particles that have an average diameter less than about 1 micrometer. The premix may be calcined. The calcining may include heating to a temperature of about 400 degrees Celsius to provide a calcined mass. The calcined mass may be contacted with a grain growth inhibitor additive to form a mixture. The mixture may be sintered at a temperature profile that may be sufficiently high that a sintered mass may be formed from the mixture, and the thermal profile may be less than about 1050 degrees Celsius.

In one embodiment, the method may include forming one or more electrodes coupled to the sintered mass simultaneously with the sintering, thereby to form a varistor having one or more electrodes coupled to, and in electrical communication through, the sintered mass. The sintered mass and the at least one electrode formable structure may be co-fired simultaneously to form the article. In another embodiment, the electrode formable structure may be formed by pressing, heating, melt flowing, casting, printing, metallizing/etching, and the like. Mechanical methods of attachment may be available in some embodiments. Alternatively, a precursor material may be disposed on the sintered mass and converted into an electrically conductive material.

Figure 2:
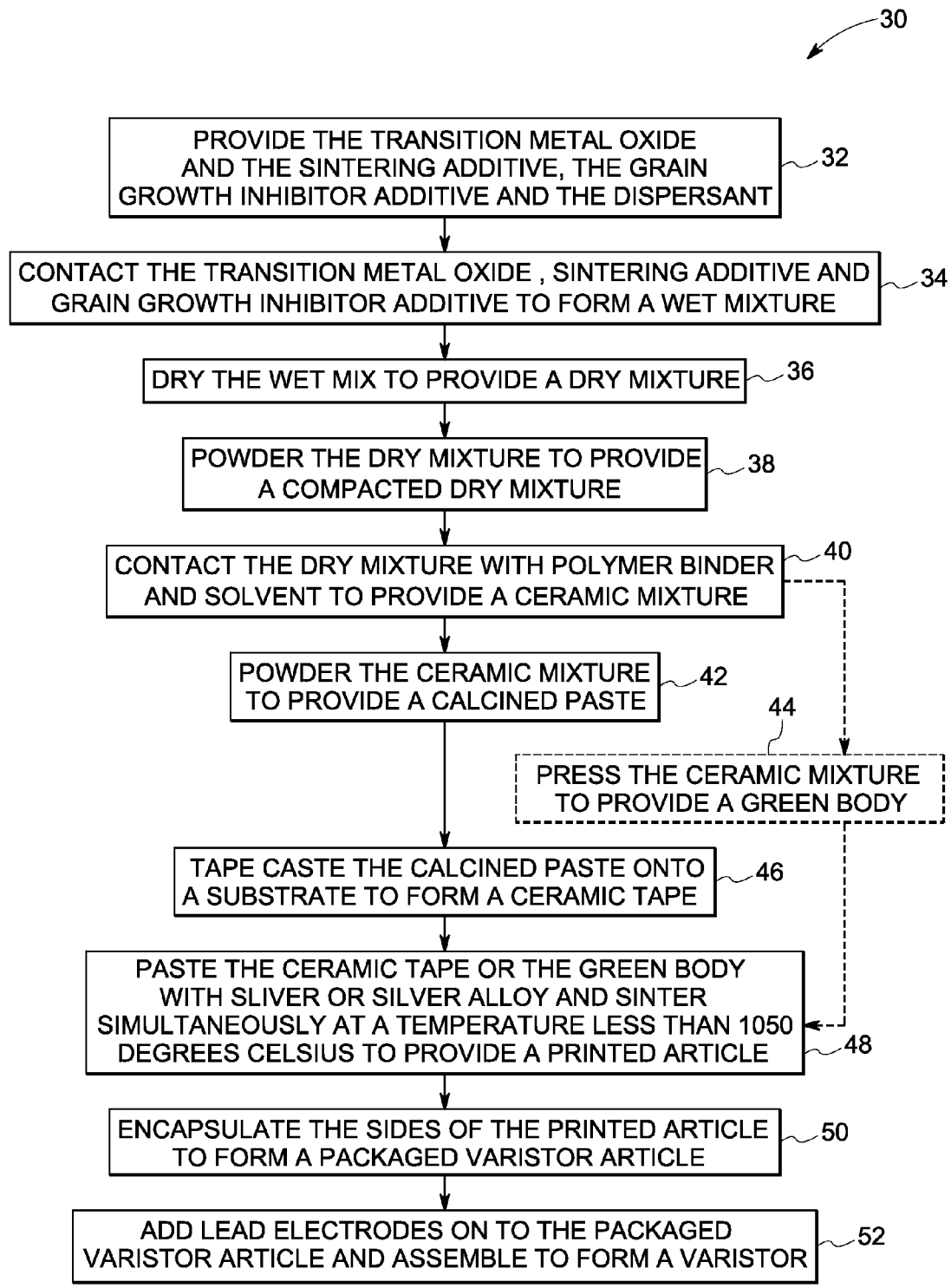
FIG. 2 shows a block diagram of a method to make an article in accordance with one embodiment of the invention.

A block diagram 30 of one embodiment of a method is provided in FIG. 2. The transition metal oxide and the sintering additive and the grain growth inhibitor additive and dispersant are provided or obtained 32. A solvent wets the transition metal oxide to form a wet slurry 34. The wet slurry is dried to provide a dry mixture 36. The dry mixture is powdered to provide a powdered dry mixture 38. The powdered dry mixture is contacted with a polymer binder and a solvent to provide a ceramic mixture 40. The ceramic mixture is powdered for example in a ball mill to provide a calcined paste 42. In one embodiment, the ceramic mixture is powdered and is pressed into a green body 44. The calcined paste is tape cast onto a substrate to form a ceramic tape 46. The green body or the ceramic tape is pasted with silver or silver alloy and sintered simultaneously at a temperature that is less than 1050 degrees Celsius to provide a printed article 48. Encapsulate the printed article to form a packaged varistor article 50. Add lead electrode onto the packaged varistor article and assemble to form the varistor 52.

In one embodiment, the article may include a sintered reaction product of transition metal oxide particles that have an average diameter that may be less than about 1 micrometer; and sintering additive particles having an average diameter that may be less than about 1 micrometer. The grain growth inhibitor additive particles may have an average diameter that may be less than about 1 micrometer. Due to the change in available surface area, and packing tendencies, particles of different sizes may form sintered masses having differing properties and characteristics.

In one embodiment, the article may include a sintered mass of particles that may include a transition metal oxide, a sintering additive, and a grain growth inhibitor additive. The sintered mass may have a density that may be greater than 98 percent of theoretical density for a composition comprising the transition metal oxide.

In one embodiment, the article may include sintered particles that include a transition metal oxide, a sintering additive, and a grain growth inhibitor additive and defining grains. The grains may have grain boundaries that define the grains to have an average grain size of less than about 0.8 micrometers. In one embodiment, the method includes contacting a transition metal oxide, a sintering additive, and a grain growth inhibitor additive to form a mixture. The mixture may be treated to a temperature profile. In one embodiment, the temperature profile includes exposure to a sinter temperature of less than about 1050 degrees Celsius.

In one embodiment, the article may respond to electrical voltage overstress of about 10 kilo Volts amount by shunting an electrical current to a ground. In another embodiment, the article may respond to electrical voltage overstress in a range from about 0.5 Volts to about 10 kilo Volts, or from about 10 kilo Volts to about 5 kilo Volts, or from about 5 kilo Volts to about 1 kilo Volts by shunting an electrical current to a ground. In one embodiment, the article may protect against an overstress above a threshold voltage of about 250 volts for a 0.5 mm thick varistor.

In one embodiment, the article may have a dielectric strength or breakdown field of greater than about 0.5 kilo Volt per millimeter. In one embodiment, the dielectric strength or breakdown field may be in a range of from about 0.5 kilo Volt per millimeter to about 1 kilo Volt per millimeter, from about 1 kilo Volt per millimeter to about 1.5 kilo Volt per millimeter, from about 1.5 kilo Volt per millimeter to about 2 kilo Volt per millimeter, from about 2 kilo Volt per millimeter to about 2.5 kilo Volt per millimeter, from about 2.5 kilo Volt per millimeter to about 3 kilo Volt per millimeter, or greater than about 3 kilo Volt per millimeter. In one embodiment, the sintered mass may have a non-linearity coefficient ($\alpha$) of greater than 25. In one embodiment, the non-linearity coefficient ($\alpha$) may be in a range of from about 25 to about 50, from about 50 to about 75, from about 75 to about 100, from about 100 to about 125, from about 125 to about 140, or greater than about 140.

In one embodiment, the article may have a dielectric constant of less than about 1000. In another embodiment, the article may have a dielectric constant in a range from about 1000 to about 800 from about 800 to about 750, or from about 750 to about 500. In one embodiment, the article may have a leakage current of less than about $10^{-5}$ Ampere per square centimeter. In another embodiment, the article may have a leakage current in a range from about $10^{-6}$ Ampere per square centimeter to about $10^{-5}$ Ampere per square centimeter. In one embodiment, the varistor may have a sintered density of more than about 95%.

EXAMPLES

The following examples illustrate methods and embodiments in accordance with the invention, and as such do not limit the claims. Unless specified otherwise, all ingredients may be commercially available from such common chemical suppliers as Alpha Aesar, Inc. (Ward Hill, Mass.), Sigma Aldrich (St. Louis, Mo.), Spectrum Chemical Mfg. Corp. (Gardena, Calif.), and the like.

Samples 1 through 3 are prepared by mixing, calcining, ball milling, and sintering. The sintering is performed in a Uniaxial Press to make a puck for each sample that is about 1 inch in diameter. The various components and the weight percent for each of the components for samples 1 to 3 are given in Table 1.

TABLE 1

| Composition (Weight percent) | Sample 1 | Sample 2 | Sample 3 | Comparative Sample 1 | Comparative Sample 2 |
|---|---|---|---|---|---|
| ZnO | 94 | 85.5 | 94.69 | 83.39 | 92.21 |
| $Bi_2O_3$ | 0.5 | 2 | 3 | 2.12 | 1.40 |
| $Sb_2O_3$ | 1 | 3 | 1.5 | 6.34 | 3.75 |
| $Al_2O_3$ | — | 2 | 0.01 | 0.04 | — |
| $SiO_2$ | 2 | 3 | — | 0.43 | 0.07 |
| $Cr_2O_3$ | 0.5 | — | — | — | 1.02 |
| MnO | — | — | — | 0.9 | 0.4 |
| $Mn_2O_3$ | 0.5 | — | 0.1 | — | — |
| MgO | — | 2 | — | — | — |
| $Fe_2O_3$ | — | — | — | 0.01 | 0.04 |
| $Co_2O_3$ | — | — | — | 1.13 | 1.17 |
| $Co_3O_4$ | 0.5 | 2.5 | 0.5 | — | — |
| NiO | 1 | — | 0.2 | 1.27 | — |
| $SnO_2$ | — | — | — | — | 0.93 |

Sample 1

A mixture is formed from zinc oxide, and additives selected from cobalt, antimony, nickel, and chromium oxide nanopowders with bismuth, silicon, manganese oxide nanopowders in a ratio given in Table 1. The zinc oxide is commercially obtainable from Horsehead Coporation, (Monaca, Pa.). The additives are commercially obtainable from Nanostructured and Amorphous Materials Inc. (Houston, Tex.).

The materials form a mixture in a mixed oxide wet process. The mixture is milled in a ball mill for about 6 hours in a ratio materials:ball:isopropyl alcohol=1:5:2 to form a slurry. The slurry is dried at 100 degrees Celsius. The dried powder is sieved and calcined at 550 degrees Celsius for about 2 hours in a Thermolyne 1400 furnace. The calcined powder is then ball milled for about 4 hours. The slurry formed is dried at 100 degrees Celsius and the dried powder is sieved. The powder is then pressed into pellets (thickness of about 1.5 millimeters) with a force of about 10000 pounds for about 1 minute. The pellet is sintered at temperatures from about 1000 degrees Celsius and 1050 degrees Celsius. The sintering is done in two different profiles including one and two steps in a Uniaxial Press for about 2 hours. The first profile is carried out at about at 1050 degrees Celsius at a heating rate of about 5 degrees Celsius per minute for about 2 hours and is allowed to cool. The second profile is carried out at about at 1000 degrees Celsius at a rate of about 10 degrees Celsius per minute for about 0.1 hours. Following this a second step sintering at a temperature of about 925 degrees Celsius to 975 degrees Celsius at a heating rate of about 10 degrees Celsius per minute is carried out for about 2 hours. The resultant product is Sample 1, which has the compositional distribution as indicated in Table 1.

Sample 2

A mixture is formed from zinc oxide, and additives selected from oxide nanopowders cobalt, and antimony, with nanopowder oxides of bismuth, silicon, aluminum and magnesium in a ratio given in Table 1.

The materials are mixed using a mixed Oxide Wet Process. The mixture is milled in a ball mill for about 6 hours in a ratio materials:ball:isopropyl alcohol=1:5:2 to form a slurry. The slurry is dried at 100 degrees Celsius. The dried powder is sieved and calcined at 550 degrees Celsius for about 2 hours in a Thermolyne 1400 furnace. The calcined powder is then ball milled for about 4 hours. The slurry formed is dried at 100 degrees Celsius and the dried powder is sieved. The powder is then pressed into pellets (thickness of about 1.5 millimeters) with a force of about 10000 pounds for about 1 minute. The pellet is sintered in a Uniaxial Press at different temperatures for about 2 hours at about 950 degrees Celsius, about 1050 degrees Celsius at a rate of about 5 degrees Celsius per minute. The resultant product is Sample 2, which has the compositional distribution indicated in Table 1.

Sample 3

A mixture is formed from zinc oxide (from Horsehead Coporation, Monaca, Pa.), and additives selected from powders of cobalt, nickel, and antimony-based materials (from Nanostructured and Amorphous Materials Inc, Houston, Tex.), and with powders of bismuth, aluminum and manganese-based materials in amounts as given in Table 1. The procedure similar to that employed to prepare sample 2 was employed for the preparation of sample 3. The resultant product is Sample 3, which has the compositional distribution indicated in Table 1.

Sample 4

A mixture is formed from zinc oxide, and additives selected from oxide powders cobalt, and antimony, with powder oxides of bismuth, silicon, aluminum and chromium in amounts as given in Table 3. Unless otherwise indicated, the powders are nanoscale and have a narrow size distribution. The general procedure employed for the synthesis of sample 2 is used to prepare sample 4. The resultant product is Sample 4, which has the compositional distribution indicated in Table 3.

Sample 5

A plurality of mixtures are formed from zinc oxide, and additives selected from cobalt, antimony, nickel, and chromium-based powders with bismuth, silicon, manganese-based powders, each in an amount as given in Table 3. The powders, unless context or language indicates otherwise, are nano-scale and have an average diameter that is less than 100 nanometers, and a relatively narrow and mono-modal size distribution. The general procedure employed for the synthesis of sample 1 is used to prepare sample 5. The resultant product is Sample 5, which has the compositional distribution as indicated in Table 3.

Sample 6-12

A mixture is formed from zinc oxide, and additives selected from powders of cobalt, lithium, nickel, and antimony-based materials, with powders of bismuth, and aluminum-based materials in amounts as given in Table 3.

The materials are mixed using a mixed oxide wet process. The mixture is milled in a ball mill for about 6 hours in a ratio of powder ingredients:ball:isopropyl alcohol of 1:5:2 to form a slurry. The slurry is dried at 100 degrees Celsius. The dried powder is sieved and calcined at 550 degrees Celsius for about 2 hours in a THERMOLYNE 1400 furnace. The calcined powder is then ball milled for about 4 hours. The slurry formed is dried at 100 degrees Celsius and the dried powder is sieved. The powder is then pressed into a plurality of pellets (thickness of about 1.5 millimeters) with a force of about 10000 pounds for about 1 minute.

The pellets are sintered in a pressureless mode at different temperatures for about 2 hours. The temperatures are: about 800 degrees Celsius (sample 6), about 850 degrees Celsius (sample 7), about 900 degrees Celsius (sample 8), about 950 degrees Celsius (sample 9), about 1000 degrees Celsius (sample 10), and about 1050 degrees Celsius (sample 11), each at a rate of about 5 degrees Celsius per minute. Sample 6 is subsequently subjected to each of the other temperature profiles. The resultant product pellets are represented in Samples 6-11, which have the compositional distribution indicated in Table 3. Additional samples 12 et seq. have the compositional makeup as indicated in Table 3, and are subject to the temperature profile of Sample 7 (850 degrees Celsius) and are prepared in the same manner as the rest of the samples in the this example.

Example 1

Figure 3:
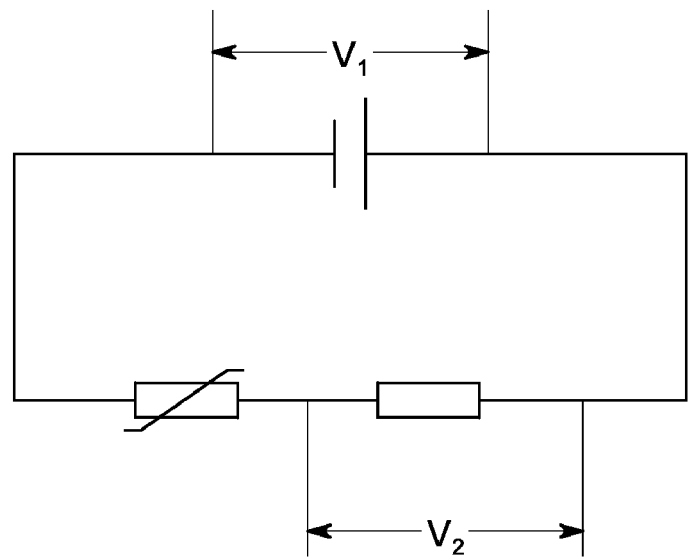
FIG. 3. shows a schematic drawing of an electrical circuit in accordance with one embodiment of the invention

The transition metal oxide and the additives are weighed to provide a powder mixture as in sample 1. The powder mixture of sample 1 is mixed using a ball mill along with a volatile film-forming polymer binder (polyvinyl alcohol and polyethylene glycol) and solvent (deionized water) to form a ceramic mixture paste. The ceramic mixture is pressed into a green body and the ceramic paste is dispersed onto a smooth surface of a rigid substrate (polyethylene terephthalate) with a release agent. The dispersion is heated to a temperature in a range from about 60 degrees Celsius to about 80 degrees Celsius in order to remove the solvent to form ceramic tapes. Silver paste is screen printed on to the green body and the semi-dry ceramic tapes in a given pattern. The silver printed tapes are heated to a temperature in a range from about 450 degrees Celsius to about 600 degrees Celsius to remove the binder and other organics. The heated silver printed tapes are then sintered simultaneously at a temperature in range from about 800 degrees Celsius to about 950 degrees Celsius to form a varistor. Terminating packages are applied on the varistor. The varistor is connected to other circuit elements to form an electrical communication 60 as shown in FIG. 3. Encapsulation of the varistor and the attachment of the leads are made.

Example 2

The transition metal oxide and the additives are weighed to provide a powder mixture as in sample 6. The procedure similar to that described above is employed to make the varistor that includes the sintered mass of sample 6.

Example 3

The transition metal oxide and the additives are weighed to provide a powder mixture as in sample 12. The procedure similar to that described above is employed to make the varistor that includes the sintered mass of sample 12.
Current-Voltage (I-V) Measurement:

A 10 kiloOhm or a 100 MegaOhm resistor 64 is connected in parallel to the varistor 62 and a voltage is applied. V1, the total voltage on sample 66 and varistor is measured using a high voltage probe. A multimeter measures the voltage on the resistor, V2. V2 is used to calculate the current flowing through the varistor as given in FIG. 3. V1-V2 is the voltage on the Samples 1-6. To measure I-V curve, at low voltage, a 100 MOhm resistor is used until the voltage on it is higher than about 100 Volts. A 10 kilo Ohm resistor is used to measure the I-V curve under high voltage (higher than about 100 Volts).

Figure 4:
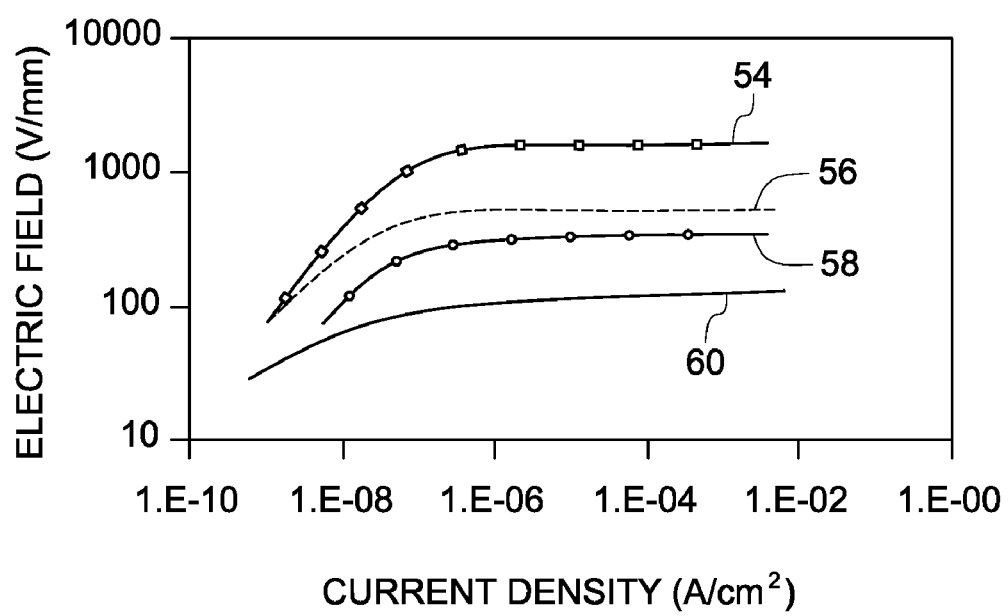
FIG. 4 shows a graph of the electric field versus the current density (current voltage graph) for an article in accordance with one embodiment of the invention and a comparative sample

FIG. 4 shows the results of metal oxide varistor materials of Samples 1-3 relative to a commercially available metal oxide varistor material. The materials of Samples 1-3 display relatively better breakdown strength and relatively better nonlinearity compared to Comparative Sample 1. The breakdown fields (electric fields when current density is 1 milliAmp per square centimeter) and nonlinearity coefficient α calculated are summarized in Table 2.

TABLE 2

Breakdown fields and nonlinearity of metal oxide varistor made from Sintered mass of Samples 1-3 and commercially available metal oxide varistor material

| Composition | Sintering Temperature (° C.)/ Time (Hours) | Breakdown Field (V/mm) | Nonlinearity coefficient α |
|---|---|---|---|
| Sample 1 | 1000/2 | 1343 | 63 |
|  | 1050/2 | 972 | 138 |
| Sample 2 | 950/2 | 2800 | 40 |
|  | 1000/2 | 2216 | 18 |
| Sample 3 | 850/2 | 1710 | 77 |
|  | 900/2 | 546 | 19 |
|  | 950/2 | 515 | 77 |
|  | 1000/2 | 400 | 42 |
|  | 1050/2 | 315 | 79 |
| Comparative Sample 1 | NA | 125 | 22 |

Table 2 shows that the metal oxide varistor materials of Samples 1-3 perform better after low temperature firing. For example, Sample 3 gives a breakdown field of greater than about 1700 volts per millimeter and a good nonlinearity coefficient (α) of about 77, but still has a low sintering temperature of 850 degrees Celsius.

Figure 5:
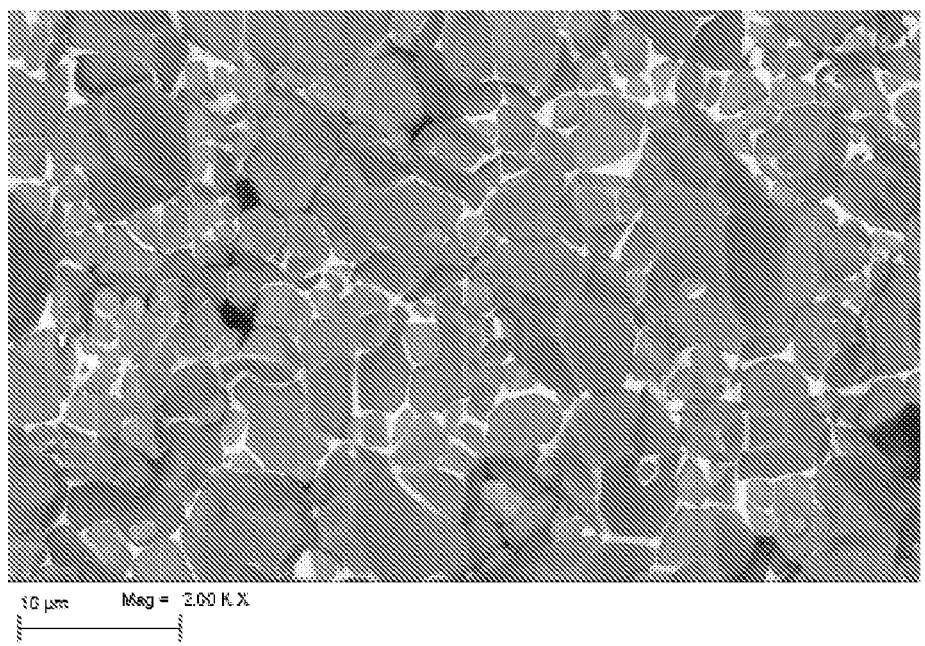
FIG. 5 shows SEM micrographs of a composition in accordance with an embodiment and a control blank.
Figure 6:
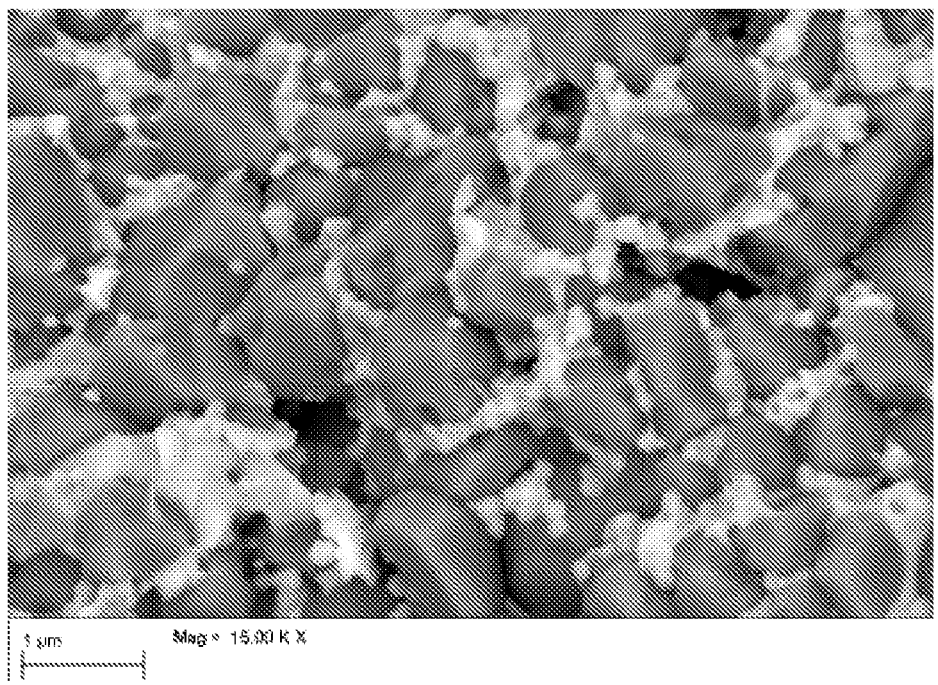
FIG. 6 shows SEM micrographs of a composition in accordance with one embodiment of the invention.

Microstructure formation may depend at least in part on the sintering profile. Grain size is found to increase at higher sintering temperature. FIGS. 5-6 compare the microstructure of a commercially available metal oxide varistor material Comparative Sample 1 (FIG. 5) with a metal oxide varistor material of Example 3 (FIG. 6). The average grain size of the metal oxide varistor materials of Sample 3 (sintered at 850 degrees Celsius) is less than 1 micrometer; and, this is in comparison to the commercially available metal oxide varistor material Comparative Sample 1 that has a grain size that is greater than 10 micrometers. Several phases may coexist in the metal oxide varistor materials of Samples 1-3. These phases may include the major conductive phase of less than 1 micrometer in size and one or more secondary phases located at the grain boundaries and in the grain boundary layer, which itself may include various dopants and sintering additives.

Table 3 shows that the metal oxide varistor materials may perform relatively well, displaying a breakdown field of greater than about 1700 volts per millimeter and a good nonlinearity coefficient (α) of greater than about 75, but still having a relatively low sintering temperature.

TABLE 3

| Composition (Wt percent) | Sample 4 | Sample 5 | Sample 6 | Samples 7-11 | Sample 12 | Sample 13 | Sample 14 |
|---|---|---|---|---|---|---|---|
| ZnO | 85.5 | 94 | 94.69 | 94.69 | 95.0 | 84.0 | 94.0 |
| $Bi_2O_3$ | 2 | 0.5 | 3 | 3 | 3.5 | 3 | 3 |
| $Sb_2O_3$ | 3 | 1.4 | 1.5 | 1.5 | 0.2 | 3 | 0.1 |
| $Al_2O_3$ | 3 | — | 0.01 | 0.01 | 0.1 | — | — |
| $SiO_2$ | 3 | 2 | — | — | 0.1 | 0.5 | 1.0 |
| $Cr_2O_3$ | 0.95 | 0.04 | — | — | 0.1 | — | — |
| MnO | — | — | — | — | 0.1 | 0.5 | — |
| $Mn_2O_3$ | — | 0.6 | — | — | 0.1 | — | — |
| MgO | 0.05 | — | — | — | 0.1 | 1 | — |
| $Fe_2O_3$ | — | — | — | — | 0.1 | 0.5 | — |
| $Co_2O_3$ | — | — | — | — | 0.1 | 2.5 | — |
| $Co_3O_4$ | 2.5 | 0.5 | 0.5 | 0.5 | 0.1 | — | — |
| NiO | — | 0.96 | 0.2 | 0.2 | 0.1 | 3 | — |
| $SnO_2$ | — | — | — | — | 0.1 | — | — |
| $Li_2CO_3$ | — | — | 0.1 | 0.1 | 0.1 | 1.5 | 0.9 |
| $LiBiO_3$ | — | — | — | — | 0.1 | — | 1 |
| CaO | — | — | — | — | 0.1 | 0.5 | — |
| Breakdown Field (V/mm) | >1800 | >1800 | >1850 | — | — | — | — |
| Nonlinearity coefficient ($\alpha$) | >75 | >80 | >75 | — | — | — | — |

Figure 7:
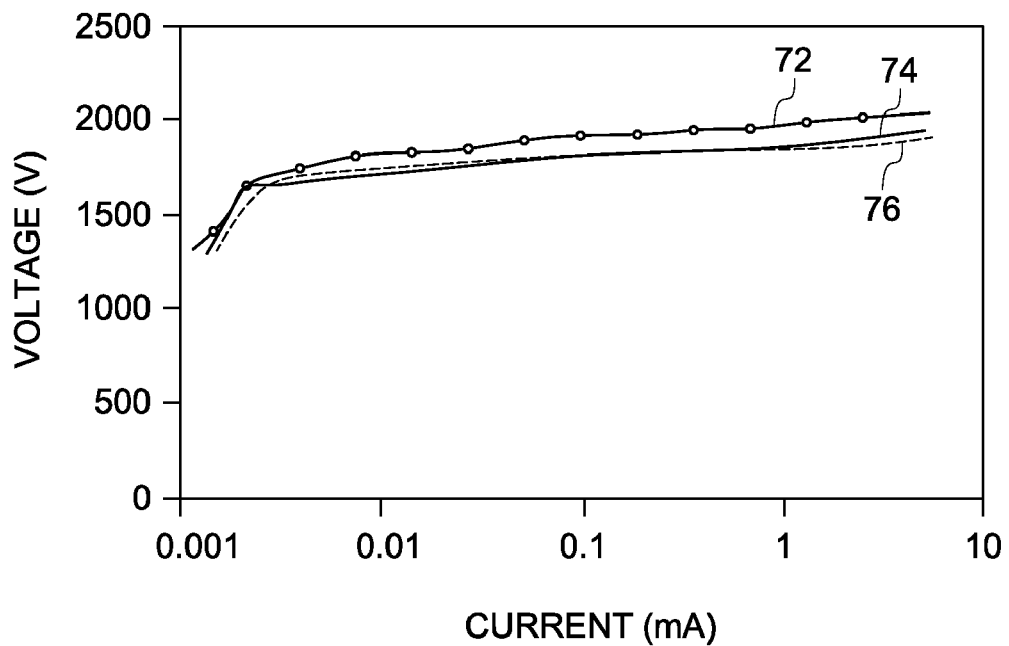
FIG. 7 shows a graph of the I-V characteristics under a DC mode (current voltage graph) for an article in accordance with one embodiment of the invention.
Figure 8:
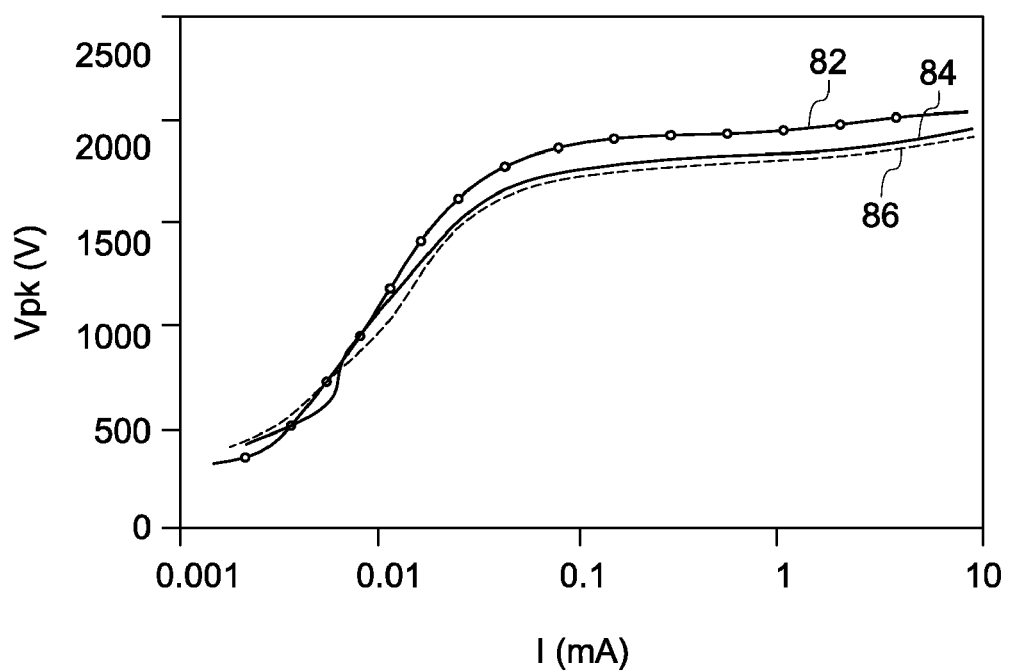
FIG. 8 shows a graph of the I-V characteristics under an AC mode (current voltage graph) for an article in accordance with one embodiment of the invention.

FIGS. 7 and 8 show a comparison of I-V characteristics under DC and AC modes respectively of the varistor samples. The sample-to-sample variation is limited and the leakage current under AC test mode is higher than DC test mode while the nonlinearity does not change much.

In the specification and claims, reference will be made to a number of terms have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be".

Reactants and components referred to by chemical name or formula in the specification or claims hereof, whether referred to in the singular or plural, may be identified as they exist prior to coming into contact with another substance referred to by chemical name or chemical type (e.g., another reactant or a solvent). Preliminary and/or transitional chemical changes, transformations, or reactions, if any, that take place in the resulting mixture, solution, or reaction medium may be identified as intermediate species, master batches, and the like, and may have utility distinct from the utility of the reaction product or final material. Other subsequent changes, transformations, or reactions may result from bringing the specified reactants and/or components together under the conditions called for pursuant to this disclosure. In these, other subsequent changes, transformations, or reactions the reactants, ingredients, or the components to be brought together may identify or indicate the reaction product or final material.

The embodiments described herein are examples of articles, compositions, and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, compositions and methods that do not differ from the literal language of the claims, and further includes other articles, compositions and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. A varistor pre-assembly, comprising: an electrode formable structure and an unsintered mass proximate to the electrode formable structure, wherein the electrode formable structure comprises a material having a melting point that is within a determined temperature relative to a sintering temperature of the unsintered mass; and wherein the electrode formable structure and unsintered mass form a varistor when simultaneously subjected to the sintering temperature that is less than about 1000 degrees Celsius.

2. The varistor pre-assembly of claim 1, wherein the electrode formable structure consists essentially of silver.

3. The varistor pre-assembly of claim 2, wherein the electrode formable structure further comprises one or more of palladium, platinum, or gold that is present in an amount or a ratio such the melting temperature of the electrode formable structure is controlled relative to the sintering temperature of the unsintered mass so that co-firing of the electrode formable structure and the unsintered mass at about the sintering temperature produces a varistor.

4. The varistor pre-assembly of claim 1, wherein the electrode formable structure is free of platinum, palladium, or both platinum and palladium.

5. The varistor pre-assembly of claim 1, wherein the electrode formable structure comprises a metal having a melting point of less than about 950 degrees Celsius.

6. The varistor pre-assembly of claim 1, wherein the unsintered mass comprises zinc oxide.

7. The varistor pre-assembly of claim 6, wherein the unsintered mass further comprises a sintering additive and a grain growth inhibitor additive.

8. The varistor pre-assembly of claim 7, wherein the sintering additive comprises one or both of $Li_2CO_3$ and $LiBiO_3$.

9. The varistor pre-assembly of claim 8, wherein the grain growth inhibitor additive comprises one or more of $SiO_2$, $Sb_2O_3$, CaO, $Al_2O_3$, MgO, or $Fe_2O_3$.

10. A varistor formed from the varistor pre-assembly of claim 1, wherein the varistor pre-assembly is sintered to form a nano-structured varistor comprising a sintered mass and an electrode, wherein the sintered mass comprises a plurality of nano-sized cores and a grain boundary layer disposed between each of the plurality of cores.

11. The varistor of claim 10, wherein an average distance from one core to an adjacent core in the plurality of cores is less than about 500 nanometers.

12. The varistor of claim 10, wherein an average diameter of the cores is less than about 500 nanometers.

13. The varistor of claim 10, wherein an average thickness of the grain boundary layer is less than about 400 nanometers.

14. The varistor of claim 10, wherein an average thickness of the nano-structured sintered mass is less than about 1000 micrometers.

15. The varistor of claim 10, wherein the varistor has a dielectric constant of less than about 1000.

16. The varistor of claim 10, wherein the varistor has a sintered density of more than about 95%.

17. The varistor of claim 10, wherein the varistor has a leakage current of less than about $10^{-5}$ Ampere per square centimeter.

18. The varistor of claim 10, wherein the varistor has a breakdown voltage of greater than about 0.5 kilo Volt per millimeter.

19. The varistor of claim 10, wherein the varistor responds to electrical voltage overstress of about 10 kilo Volts by shunting electrical current to a ground.

20. The varistor of claim 10, wherein the varistor protects against an overstress above a threshold voltage of about more than about 250 volts.

21. A method, comprising: sintering a unsintered mass at a temperature profile that is sufficiently high that a sintered mass is formed from the unsintered mass, and the temperature profile is less than about 1050 degrees Celsius; and forming one or more electrodes coupled to the sintered mass simultaneously with the sintering, and thereby to form a varistor having one or more electrodes coupled to, and in electrical communication through, the sintered mass.

22. The method of claim 21, further comprising selecting the electrode to be a metal having a melting point within a determined temperature range relative to the temperature profile.

* * * * *